United States Patent [19]

Elkins et al.

[11] 4,275,908

[45] Jun. 30, 1981

[54] FLUID COUPLING ASSEMBLY

[75] Inventors: Christopher W. Elkins; David W. Smith, both of Ft. Collins, Colo.

[73] Assignee: Teledyne Industries, Inc., Ft. Collins, Colo.

[21] Appl. No.: 146,456

[22] Filed: May 5, 1980

Related U.S. Application Data

[63] Continuation-in-part of Ser. No. 66,936, Aug. 16, 1979, abandoned.

[51] Int. Cl.³ ............................................. F16L 9/14
[52] U.S. Cl. ................................... 285/55; 285/266; 285/345; 285/423
[58] Field of Search .............. 285/266, 263, 347, 423, 285/DIG. 8, 166, 167, 55, 345; 239/383, 548, 444, DIG. 19; 403/12, 128, 131

[56] References Cited

U.S. PATENT DOCUMENTS

| | | | |
|---|---|---|---|
| 834,841 | 11/1906 | Day | 285/346 X |
| 1,772,547 | 8/1930 | Keese et al. | 285/266 X |
| 1,795,155 | 3/1931 | White | 285/266 X |
| 1,801,892 | 4/1931 | White | 285/266 X |
| 3,801,014 | 4/1974 | Trenury et al. | 239/383 |

FOREIGN PATENT DOCUMENTS

| | | | |
|---|---|---|---|
| 1060203 | 6/1954 | Fed. Rep. of Germany | 285/266 |
| 757204 | 10/1933 | France | 285/266 |
| 1220243 | 1/1965 | France | 285/423 |

*Primary Examiner*—Dave W. Arola
*Attorney, Agent, or Firm*—Hugh H. Drake

[57] ABSTRACT

For mounting a showerhead or the like to a pipe, a pivot ball is formed entirely of plastic material. It has a base internally threaded to attach to the pipe and a hollow shell coupled to the base so as to constitute the spherical portion of a ball joint. That spherical portion is composed of first and second mating approximately semi-hemispherical segments. The first segment is formed integrally with the base and the second segment is coupled to that base in establishment of the spherical ball. An internal tube extends from the second segment essentially through the entire assembly. In a second version, the internal tube is shorter but also serves to secure the two segments together. This version has a base which is externally threaded. Still another version has a different form of mating between the segments.

38 Claims, 8 Drawing Figures

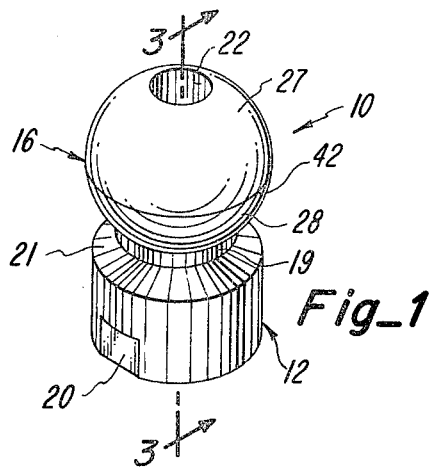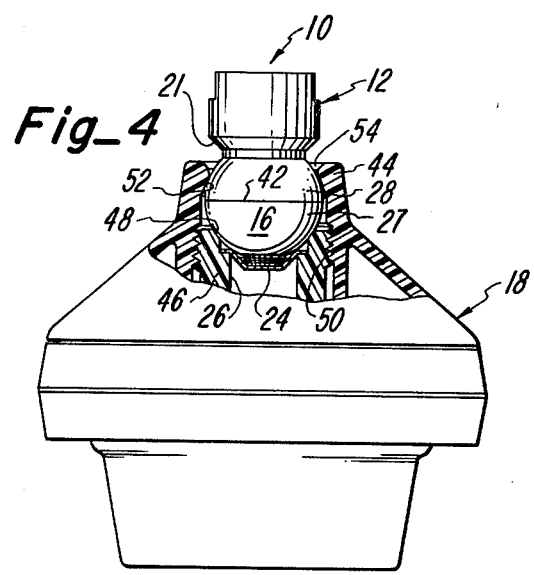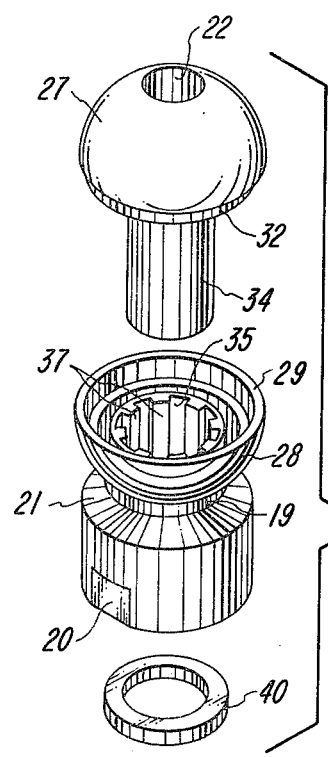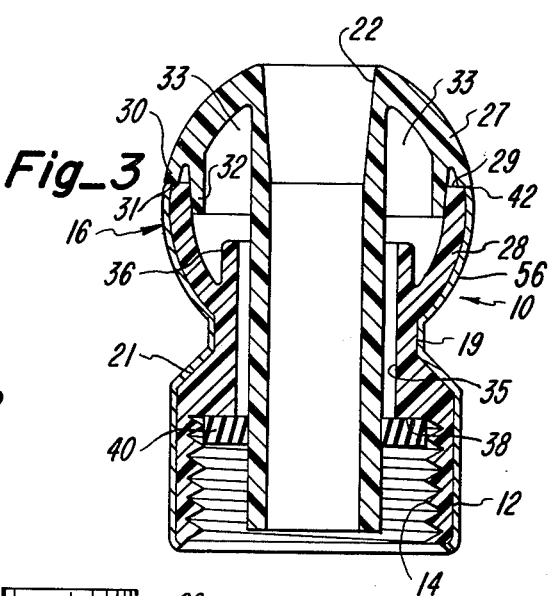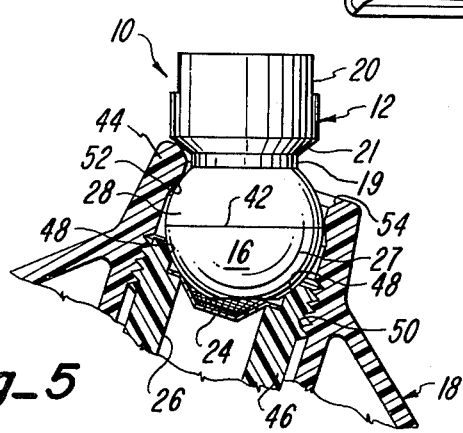

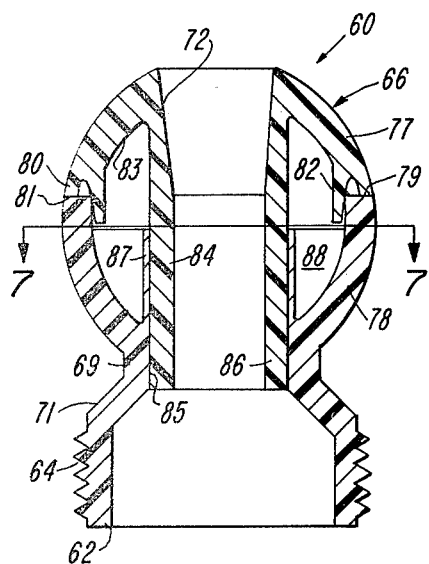
Fig_6
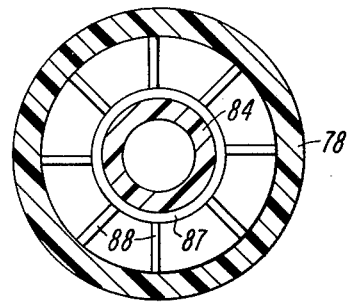
Fig_7
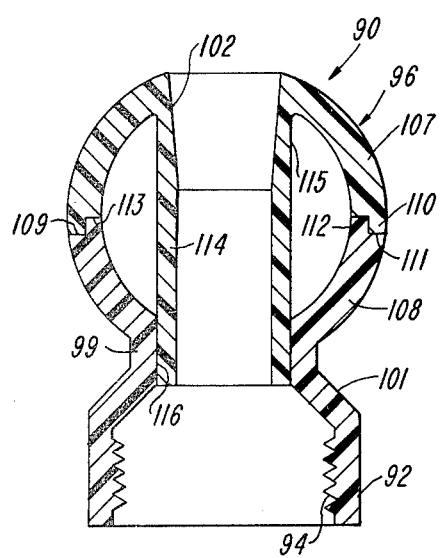
Fig_8

FLUID COUPLING ASSEMBLY

RELATED APPLICATION

This application is a continuation-in-part of copending application Ser. No. 066,936, filed Aug. 16, 1979, and now abandoned, by the same inventors and assigned to the same assignee.

The present invention pertains to a fluid coupling assembly. More particularly, it relates to the formation of a ball-joint fluid-flow coupling such as used for mounting a showerhead upon a supply pipe.

Showerheads for personal use have typically been mounted upon a ball joint that has an internal channel to carry water to the showerhead, while at the same time permitting the user to adjust the direction of delivery of the spray from the showerhead. For many years, such showerheads were formed of cast or machined metal parts, and they were coupled to a supply pipe by means of a ball and socket type of joint wherein the ball and its base were cast or machined as a rigid metal part. Of course, attention was given to establishing a water-tight seal within the ball joint so as to prevent the undesired escape of water therearound.

In recent years, considerable interest has been devoted to the production and sales of showerheads that feature improved performance in a number of different respects. For example, U.S. Pat. No. 3,801,019 describes a massage-action showerhead that has found outstanding success in the marketplace. A number of other patents have issued with respect to improved showerheads having various different modes of operation.

One interesting aspect of the present generation of extra-performance showerheads is that their cost has been maintained at an acceptable level in part by reliance almost entirely upon the use of molded plastic parts. In some cases, the use of plastic materials for the parts has afforded a still further advantage of avoiding the need for external lubrication as between components that have to move relative to one another.

Despite the vigorous activity in new and improved showerhead design, and the movement in that art toward the use of molded-plastic components, one necessary component has remained the same as used for many, many years. That has been the aforementioned swivel ball unit which couples to the supply pipe and pivotally mounts the showerhead. As indicated, it has usually been an internally-bored machined metal part threaded at one end to mount upon the supply pipe and shaped to define a ball at its other end so as to pivotally mount the showerhead. That particular component, therefore, has remained as an expensive and heavy element in any total assembly. While a plastic material may be directly substituted for the metal, that approach makes it difficult to maintain adequate seals against leakage and the resulting product may not have as attractive an appearance.

In view of the foregoing, it is a general object of the present invention to provide a new and improved fluid coupler which overcomes deficiencies in prior couplers used for the same purpose.

A further object of the present invention is to provide a new and improved fluid coupler which, as viewed by the user, is capable of being every bit as attractive as its solid-metal predecessor.

Another object of the present invention is to provide a new and improved fluid coupler and coupling assembly that obviates the necessity of any further sealing element disposed between the ball and the attached device.

Other specific objectives are to provide new and improved pivotal fluid couplers that feature (1) permitting the use of an all-plastic assembly in place of a metal assembly, (2) avoiding reliance on threads to effect a seal, (3) the employment of a single element to complete seals both to the supply pipe and between different parts of the assembly, (4) an appearance which in use is the same as that of a chrome-plated metal coupler and (5) making it practical to use injection molding and to achieve proper metallic plating.

In accordance with the present invention, a fluid coupler includes a base that has means for attachment to a supply pipe. An element is coupled to the base and constitutes the spherical portion of a ball joint. That element is composed of first and second mating approximately hemispherical segments. The first segment is secured to the base, the second segment is coupled to the base in establishment of the spherical portion, and a fluid flow channel is defined through both segments and the base. Various features desirably included involve forming the segments as shells, difference between the segments in material characteristics, a connecting tube which also defines the channel and a multiple purpose sealing gasket.

The features of the present invention which are believed to be patentable are set forth with particularity in the appended claims. The orgnaization and manner of operation of the invention, together with further objects and advantages thereof, may best be understood by reference to the following description taken in connection with the accompanying drawings, in the several figures of which like reference numerals identify like elements, and in which:

FIG. 1 is an isometric view of a fluid coupler constructed in accordance with an embodiment of the present invention;

FIG. 2 is an exploded isometric view of the coupler shown in FIG. 1;

FIG. 3 is an enlarged cross-sectional view taken along the line 3—3 in FIG. 1;

FIG. 4 is a reduced side elevational view, partially broken away into a cross section, showing a showerhead mounted upon the coupler of FIG. 1;

FIG. 5 is an enlarged fragmentary cross-sectional view showing the assembly of FIG. 4 but with the showerhead pivoted to a different position;

FIG. 6 is a view similar to FIG. 3 but of an alternative embodiment;

FIG. 7 is a cross-sectional view taken along the line 7—7 in FIG. 6; and

FIG. 8 is a view also similar to FIG. 3 but of still another alternative embodiment.

A fluid coupler 10 has a base 12 internally threaded as at 14 for attachment to a conventional water supply pipe. Coupled to base 12 is an element or ball 16 that constitutes the spherical portion of a ball joint upon which is to be pivotally mounted a showerhead 18 as shown in FIGS. 4 and 5. Except for features yet to be described, coupler 10, when ultimately assembled, may have exactly the same external shape as similar elements heretofore known for the same purpose. That is, base 12 is coupled to ball 16 by a neck 19, and the lower marginal wall of base 12 may include notches 20 that accept the jaws of a wrench employed to tighten base 12 onto the supply pipe. However, notches 20 may be omitted.

The cylindrical exterior surface of base 12 is tapered into neck 19 to define a shoulder 21. Also included is an internal channel 22 that allows water from the supply pipe to be delivered into the pivotally-attached showerhead, such as through a filter screen 24 and on through a channel 26 by means of which water is admitted on into the body of showerhead 18 itself.

In this case, however, ball 16 is separated into a pair of mating approximately hemispherical segments 27 and 28. As viewed in FIG. 3, segment 28 has an upper margin which defines a flat annular land 29. Segment 27 terminates at its lower rim or margin in a narrowed annular skirt 30 which continues the definition of its exterior surface curvature and presents an annular flat 31 that faces land 29. Spaced inwardly from and projecting below skirt 30 is an annular lip 32 the exterior surface of which tapers slightly inward toward its lower end. Upon assembly, lip 32 nests snugly within segment 28 and aligns the exterior surfaces to form a smooth joint between the two segments.

Segments 27 and 28 are each in the form of hollow half shells that define a cavity 33. Projecting inwardly of the resulting ball 16 from the upper end of and defining internal channel 22 is a tube 34. Tube 34 projects integrally downward from the upper end of segment 27 through cavity 33 and an internal bore 35 into the interior of threaded portion 14. Bore 35 is defined by the internal wall of base 12 above threaded portion 14 and continues within neck 19 into an annular skirt 36 that projects within segment 28. Formed on the surface of bore 35 are a series of circumferentially-spaced flutes 37 (FIG. 2) that encircle tube 34 with a slightly loose tolerance.

During assembly, flutes 37 assist in guiding tube 34 to bring segments 27 and 28 into proper mating relationship. Upon installation, tube 34 has an external diameter of a size which permits it to be slipped inside the conventional supply pipe. Should the lower end of tube 34 engage the end of that supply pipe, the close fit of flutes 37 also serves to prevent cocking of tube 34 to one side an amount sufficient to cause undue pressure of lip 32 against segment 28 which otherwise, depending upon the specific material used, could create a stress fracture or a rupture of exterior plating.

Bore 35 terminates at its lower end in a shoulder 38 that extends laterally from the bore to threaded portion 14. Seated snugly on tube 34 is an annular gasket 40 the upper side of which is pressed against shoulder 38. To allow insertion within base 12, the external diameter of gasket 40 is only slightly less than the internal thread diameter.

After assembly and before installation, gasket 40 is a fastener that merely holds the parts together during shipment and handling. Upon installation, however, the threads at 14 draw base 12 upon the supply pipe, so that its outer end is pressed against the lower side of gasket 40. That compression of gasket 40 creates a first seal between base 12 and the supply pipe. At the same time, it also creates a seal between tube 34 and shoulder 38 which prevents water from entering cavity 33 and leaking out through the junction 42 at the joint between segments 27 and 28. Moreover, gasket 40 serves additionally to secure segments 27 and 28 together even more forcefully than before. To these ends, gasket 40 preferably is made from a low-durometer elastomer such as buna-N, polypropylene, urethane or polyethylene.

Showerhead 18 includes a collar 44 that embraces the exterior surface of segment 28 for pivotal movement thereon. Included within showerhead 18 is a connecting tube 46 that is formed at the interior of its upper end, as viewed in FIGS. 4 and 5, to present an annular segmental-spherical bearing 48 into engagement with the exterior surface 27. The outer end portion of tube 46 is threaded at 50 to mate with internal threads formed at the lower end of collar 44. Spaced beyond those internal threads, the internal diameter of collar 44 tapers inwardly toward to open upper end in definition of an annular seat 52 that engages the exterior surface of segment 28.

By threading collar 44 tightly upon tube 46, ball 16 becomes clamped between bearing 48 and seat 52, so that showerhead 18 is held in whatever orientation it had when the collar was tightened. Upon slightly loosening collar 44, however, showerhead 18 may be pivoted or rotated around ball 16 to any desired orientation within certain pivotal limits. Sufficient frictional engagement remains between ball 16 and bearing 48 together with seat 52 to retain the selected orientation. Of course, collar 44 may be entirely unthreaded to permit removal of the remainder of the showerhead, and its installation could involve a reversal of that procedure.

On beyond seat 52, the internal diameter of collar 44 remains constant for a short distance and then diverges to the end as an annular bevel 54. Abutment of the outer end of bevel 54 against shoulder 21 on base 12 establishes the pivotal limits mentioned above. The distance within collar 44 to seat 52 is selected, in view of the location of shoulder 21, so that seat 52 rides only upon segment 28 and never crosses junction 42. Analogously, bearing 48 has a maximum diameter such that, by reason of abutment of collar 44 against shoulder 21, no part of the surface of bearing 48 can cross junction 42 and engage segment 28. That is, bearing 48 can engage only segment 27.

Base 12 and segment 28 are integrally molded together from a rigid engineering thermoplastic such as mineral-filled nylon, polysulfone, ABS, modified PPO or other plastics. Such materials provide sufficient strength for fastening at threaded area 14. In addition, the surfaces of base 12 and segment 28 desirably are electro-plated with a chrome or other metallic finish or surface 56. Any such finish, however, is not included on segment 27. The latter, instead, is formed of a resilient plastic such as polypropylene, polyethylene or urethane. Segment 27 forms a seal to bearing 48 without the need for any additional sealing gasket or other barrier.

As has been observed, applicant provides a pivot ball assembly or fluid coupler that may be externally shaped exactly the same as articles previously available and serves the very same purpose although it overcomes the deficiencies therein. The difference from such similarly-appearing couplings is substantial. The only additional seal needed is gasket 40, and that also serves to hold the two different segments together. Also, the resiliency of the material of segment 27 is sufficient to preclude the need for any other seal internally within the attached device such as showerhead 18. On the other hand, segment 27 will function when engaged with a sealing washer additionally included in the showerhead or the like. The total design is such as to allow all exposed surfaces, such as segment 28 and base 12, to be attractively finished with a metallic plating or other coating.

In use, the surface of segment 27, which is uncoated, is concealed from view.

It also will now be appreciated that the coupler may be made entirely of plastic and it avoids the need to rely on threads to effect a seal to the supply pipe. The single gasket also completes a seal between the different parts of the assembly. The resulting product enables substantial cost saving both in manufacture and in shipping. The provision of cavity 33 makes it practical to form the parts by means of injection molding by reason of reduced wall thickness, and that also enables the attainment of proper metallic plating.

In an alternative to the construction illustrated in FIGS. 1–3, flutes 37 are omitted and bore 35 is assigned a diameter to frictionally receive hollow tube 34. That fit holds segments 27 and 28 together and also seals together the mating surfaces of tube 34 and bore 35. That degree of seal is sufficient that, at least under normal household conditions of water pressure, gasket 40 need not be included in order to secure adequately leak-free mounting of base 12 upon a supply pipe. A preferred embodiment of this alternative approach is illustrated in FIG. 6.

In FIGS. 6 and 7, a fluid coupler 60 has a base 62 externally threaded as at 64 for attachment to mating internal threads on an associated nipple or other form of coupling. That coupling may be part of an entirely separate device of which one specific example, in which the version of FIG. 6 specifically may be utilized, is the mist-forming arrangement described and claimed in co-pending application Ser. No. 109,882, filed Jan. 7, 1980, and assigned to the same assignee as the present application.

Coupled to base 62 is a ball 66 that again constitutes the spherical portion of the ball joint upon which showerhead 18 or other appliance is to be mounted. Base 62 is coupled to ball 16 by a neck 69. The cylindrical exterior surface of base 62 is tapered into a neck 69 to define a shoulder 71 which may be employed for the same purpose as the shoulder in the earlier version. Also included is an internal channel 72 through which the water is to flow for delivery.

Ball 66 again is separated into a pair of mating approximately hemispherical segments 77 and 78. Segment 78 has an upper margin which defines a flat annular land 79. Segment 77 terminates at its lower end or margin in a narrowed annular skirt 80 which constitutes the definition of its exterior surface curvature and presents an annular flat 81 that faces land 79. Spaced inwardly from and projecting below skirt 80 is an annular lip 82 the exterior surface of which tapers slightly inward toward its lower end so that, upon assembly, lip 82 fits snugly within segment 78 and aligns the exterior surfaces to form a smooth joint between the two segments.

Segments 77 and 78, each again being the form of hollow half shells, define a cavity 83. Projecting inwardly from the upper end of segment 77 and defining internal channel 72 is a tube 84. Tube 84 projects integrally downward through cavity 83 into the interior of neck 69.

The interior of neck 69 defines a bore 85 within which the adjacent and in this case lower end portion 86 of tube 84 is sized to have an interference fit therewith. That is, the lower end of tube 84 is received only very tightly within bore 85 so as to secure the formation, when segments 77 and 78 are mated together, of a water tight and secure attachment. For the dimensions appropriate to pivot balls of the kind in question, the amount of intererence or negative tolerance typically is up to 0.012 inch.

Preferably, bore 85 is extended upwardly as a sleeve 87 joined to segment 78 by a spider composed of radial webs 88. That allows a greater degree of seal area, strengthens the ball and yet allows elimination of volumes too thick to be either molded or plated properly.

FIG. 8 illustrates a further modification of the connecting approach represented in the embodiment of FIGS. 6 and 7. In this case, a fluid coupler 90 has a base 92 internally threaded at 94 for attachment to a pipe. Coupled to base 92 is a ball 96. Base 92 is coupled to ball 96 by a neck 99 defined at the upper end of base 92 above a shoulder 101. An internal channel 102 is defined as before.

Again, ball 96 is separated into a pair of mating approximately hemispherical segments 107 and 108. Segment 108 has an upper margin which defines a flat annular land 109. Segment 107 terminates at its lower rim or margin in a narrowed annular skirt 110 which continues the definition of its exterior surface curvature and presents an annular flat 111 that faces land 109. The inward and upwardly-facing rim of segment 108 defines an annular lip 112 disposed inside skirt 110 and nested snugly within segment 107. The inward portion of the margin of segment 107 defines a recess 113 into which lip 112 is seated. This combination of the mating of skirt 110 against flat 111 and lip 112 in recess 113 serves to insure that segments 107 and 108 are joined together without any mismatch at their common external junction.

Projecting inwardly of the resulting ball 96 from the upper end of and defining channel 102 is a tube 114 around which is defined a cavity 115. Tube 114, as in the case of FIG. 6, projects integrally downward from the upper end of segment 107 through cavity 115 toward base 92 and is inserted in use into a bore 116 defined on the interior of neck 99. As in the case of the embodiment of FIG. 6, the lower end portion of tube 114 is sized so as to fit frictionally within bore 116 with an interference fit sufficient to permit water flow through this connection and to secure the parts firmly together. Although not shown in FIG. 8, the spider of extension 87 and webs 88 may be incorporated in the same manner.

It is to be observed that different features individually found within respective ones of the corresponding embodiments may be interchanged. For example, the base on any of the embodiments may be formed to include either internal or external threads, depending upon the nature of the matable threads formed on the apparatus to which the ball assembly is to be attached. The specific materials illustratively mentioned for use in the formation of the embodiment of FIGS. 1–3 may similarly be employed in the embodiment of FIGS. 6 and 7. The separable parts individually may be exteriorly plated with an attractive finish when desired for appearance purposes.

In general, the embodiment of FIGS. 1–3 contemplated the inclusion of gasket 40 in order to effect a seal to a supply pipe and not rely upon included threads for performing that seal function. Using plastic materials as described, however, it has been found that adequate water seal is readily obtainable by direct engagement of a threaded portion of the ball assembly with mating threads on a supply pipe or other connecting device, In any case, all versions illustrated take the form of a coupler which may be made entirely from plastic material, resulting in cost saving in both manufacturing and in shipping. Whatever the specific form of matable junction formed between the upper and lower segments of the ball, and variations in that respect may well occur, it has been demonstrated that the two segments are capable of being securely mounted together while yet in combination presenting and overall exterior spherical surface receptive of and fully and properly cooperative with a mating spherical cavity.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

We claim:

1. In a fluid coupler that includes:
   a base including means for attachment to a supply pipe;
   and an element coupled to said base and which constitutes the spherical portion of a ball joint;
   the improvement comprising:
   said element being composed of first and second mechanically-joined and contiguously mating approximately hemispherical segments;
   means for securing said first segment to said base;
   means, disposed entirely within the interior of said segments, for coupling said second segment to said base in establishment of said spherical portion unencumbered on its exterior;
   and means defining a fluid flow channel through said base and said first and second segments.

2. A fluid coupler as defined in claim 1 in which said first segment is formed integrally with said base.

3. A fluid coupler as defined in claim 1 in which said second segment if formed of a resilient plastic material.

4. A fluid coupler as defined in claim 1 which further includes:
   a collar having an annular seat which embraces the exterior surface of said first segment for pivotal movement thereon;
   a connecting tube having an annular segmental-spherical bearing engaged with the exterior surface of said second segment for pivotal movement thereon;
   and means for adjustably connecting said tube to said collar.

5. A fluid coupler as defined in claim 4, in which the amount of said pivotal movement is limited and in which said bearing is disposed so that it can engage only said second segment during said pivotal movement.

6. A fluid coupler as defined in claim 4 in which the amount of said pivotal movement is limited and in which said seat is disposed so that it can engage only said first segment during said pivotal movement.

7. In a fluid coupler that includes: a base including means for attachment to a supply pipe;
   and an element coupled to said base and which constitutes the spherical portion of a ball joint;
   the improvement comprising:
   said element being composed of first and second mating approximately hemispherical segments;
   means for securing said first segment to said base;
   means for coupling said second segment to said base in establishment of said spherical portion;
   means defining a fluid flow channel through said base and said first and second segments;
   said second segment being formed of a resilient plastic material;
   and said first segment being formed of a rigid plastic material.

8. A fluid coupler as defined in claim 4 in which said base and said first segment are metallically coated and in which said second segment is uncoated.

9. In a fluid coupler that includes:
   a base including means for attachment to a supply pipe;
   and an element coupled to said base and which constitutes the spherical portion of a ball joint;
   the improvement comprising:
   said element being composed of first and second mating approximately hemispherical segments;
   means for securing said first segment to said base;
   means for coupling said second segment to said base in establishment of said spherical portion;
   means defining a fluid flow channel through said base and said first and second segments;
   and each of said segments being in the form of a hollow shell with said segments together defining a cavity.

10. A fluid coupler as defined in claim 9 in which one of said first and second segments has a rim which defines an annular land that faces the other segment, and in which the other of said segments has a margin that defines a skirt having an exterior surface mating in curvature with said one segment and terminates in an annular flat abutted against said land.

11. A fluid coupler as defined in claim 10 in which said margin also defines an annular lip spaced inside and projecting beyond said skirt and nested snugly within said one segment.

12. A fluid coupler as defined in claim 10 in which said rim also defines an annular lip disposed inside said skirt and nested snugly within said other segment.

13. A fluid coupler as defined in claim 12 in which said margin also defines an annular recess within which said lip is seated.

14. A fluid coupler as defined in claim 9 in which said second segment includes a tube that projects through the interiors of both said first and second segments.

15. A fluid coupler as defined in claim 14 in which said tube connects integrally to said second segment.

16. A fluid coupler as defined in claim 14 in which said coupling means includes a fastener that holds said tube in a fixed position relative to said first segment.

17. A fluid coupler as defined in claim 16 in which said tube also extends within said base and in which said fastener secures said base to said tube.

18. A fluid coupler as defined in claim 16 in which said fastener establishes a seal between said base and said supply pipe.

19. A fluid coupler as defined in claim 16 in which said fastener establishes a seal between said base and said tube.

20. A fluid coupler as defined in claim 17, 18 or 19 in which said fastener is a gasket that encircles said tube.

21. A fluid coupler as defined in claim 9 in which a hollow tube, connected to said second segment and defining said channel, projects through said cavity and said base.

22. A fluid coupler as defined in claim 21 in which said tube has an external diameter of a size to slip within said supply pipe.

23. A fluid coupler as defined in claim 21 in which a gasket encircles said tube within said base.

24. A fluid coupler as defined in claim 23 in which said gasket effects a seal between said base and said supply pipe.

25. A fluid coupler as defined in claim 23 in which said gasket effects a seal between said base and said tube.

26. A fluid coupler as defined in claim 23 in which said gasket holds said segments together.

27. A fluid coupler as defined in claim 23 in which said gasket seals an entrance to said cavity.

28. A fluid coupler as defined in claim 23 in which said gasket holds said segments together, effects seals between said base and both said supply pipe and said tube and seals an entrance to said cavity.

29. A fluid coupler as defined in claim 21 in which said base includes means defining an internal bore and in which said tube is closely fitted within said bore.

30. A fluid coupler as defined in claim 9 in which a hollow tube, connected to said second segment and defining said channel, projects through said cavity and toward said base.

31. A fluid coupler as defined in claim 30 which includes means, spaced from said second segment, for defining a bore, and in which said tube is sized to be received within said bore in an interference fit therewith.

32. A fluid coupler as defined in claim 31 in which said first segment is joined integrally to said base by a neck portion, and in which said bore is defined within said neck portion.

33. A fluid coupler as defined in claim 31 in which said bore is further defined by a sleeve projecting within said cavity and joined to said first segment by a spider.

34. A fluid coupler as defined in claim 21, 30 or 31 in which said tube merges integrally into said second segment and defines an opening in the surface of said second segment.

35. A fluid coupler as defined in claim 9 in which said base and said first segment are metallically coated and in which said second segment is uncoated.

36. In a fluid coupler that includes:
a base including means for attachment to a supply pipe;
and an element coupled to said base and which constitutes the spherical portion of a ball joint;
the improvement comprising:
said element being composed of first and second mating approximately hemispherical segments;
means for securing said first segment to said base;
means for coupling said second segment to said base in establishment of said spherical portion;
means defining a fluid flow channel through said base and said first and second segments;
a collar having an annular seat which embraces the exterior surface of said first segment for pivotal movement thereon;
a connecting tube having an annular segmental-spherical bearing engaged with the exterior surface of said second segment for pivotal movement thereon;
means for adjustably connecting said tube to said collar;
and said first segment being of a rigid plastic material and said second segment being of a resilient plastic material.

37. A fluid coupler as defined in claim 36, in which said base and said first segment are metallically coated and said second segment is uncoated.

38. In a fluid coupler that includes:
a base including means for attachment to a supply pipe;
and an element coupled to said base and which constitutes the spherical portion of a ball joint;
the improvement comprising:
said element being composed of first and second mating approximately hemispherical segments;
means for securing said first segment to said base;
means for coupling said second segment to said base in establishment of said spherical portion;
means defining a fluid flow channel through said base and said first and second segments;
a collar having an annular seat which embraces the exterior surface of said first segment for pivotal movement thereon;
a connecting tube having an annular segmental-spherical bearing engaged with the exterior surface of said second segment for pivotal movement thereon;
means for adjustably connecting said tube to said collar;
the amount of said pivotal movement being limited and said seat being disposed so that it can engage only said first segment during said pivotal movement;
and said base and said first segment both being metallically coated and said second segment being uncoated.

* * * * *